Patented May 22, 1928.

UNITED STATES PATENT OFFICE.

IVAN GUBELMANN AND JOHN M. TINKER, OF SOUTH MILWAUKEE, WISCONSIN, ASSIGNORS TO THE NEWPORT COMPANY, OF CARROLLVILLE, WISCONSIN, A CORPORATION OF DELAWARE.

PROCESS OF PREPARING H-ACID.

No Drawing. Original application filed May 9, 1925, Serial No. 29,215. Divided and this application filed November 4, 1925. Serial No. 66,755.

This invention relates to the preparation of H-acid or 1, 8-aminonaphthol-3, 6-disulfonic acid by the fusion with caustic alkalies of 1-naphthylamine-3, 6, 8-trisulphonic acid. This application is a division of our application entitled "Process of preparing 1-8 aminonaphthol sulphonic acid," Serial No. 29,215 filed May 9, 1925, issued as Patent No. 1,573,056, and relates back to the subject-matter of that application.

The ordinary fusion with caustic alkalies of 1-naphthylamine sulfonic acids containing a sulfonic acid group in the 8-position constitutes a well-known method by which 1, 8-aminonaphthol sulfonic acids are generally prepared on a technical scale. We have found that by following methods in use heretofore considerable decomposition takes place, through the splitting off of ammonia, resulting in the formation as an impurity of 1, 8-dihydroxynaphthalene sulfonic acid. This decomposition not only lowers the yield but also causes the presence of undesirable impurities in the finished product.

The present invention, therefore, has for an object the production of 1, 8-aminonaphthol sulfonic acids by an improved method in which the fusion of 1-naphthylamine sulfonic acids which contain a sulfonic acid group in the 8-position is carried out with the least possible decomposition, resulting in excellent yields and a high quality of finished product.

Other and further important objects of this invention will be apparent from the disclosures in the following description, which sets forth the preferred form of our invention.

We have found that the fusion with caustic alkalies of the 1-naphthylamine sulfonic acids proceeds very much more smoothly in the presence of ammonia. The presence of ammonia introduced prior to the caustic alkali fusion prevents almost entirely the splitting off of ammonia formed by the decomposition of the amino groups in the 1, 8-naphthylamine sulfonic acids used. We prefer to operate with ammonia pressures of from 75–150 lbs., but higher or lower pressures may be employed if desired. Without limiting our invention to any particular procedure, the following example is given as illustrating the application of our improved method in a preferred form:

Charge an autoclave with 1000 lbs. water, 1000 lbs. caustic soda and 1000 lbs. 1-naphthylamine-3, 6, 8-trisulfonic acid in the form of the di-sodium salt. After complete solution of the charged material, the autoclave is closed and 200 lbs. of 29% aqueous ammonia is added. The temperature of the mixture is gradually raised to 173–176° C. and maintained at that temperature for 2–3 hours. After releasing the pressure, the fusion mass is worked up by the usual methods, consisting of diluting, acidifying, filtering off the precipitate, and drying the same. This end product is a very pure 1, 8-aminonaphthol-3, 6-disulfonic acid in the form of its mono-sodium salt, commercially known as H-acid. The chemical formula for H-acid is

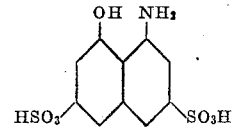

If the H-acid made according to the foregoing process is analyzed, it will be found that the amount of 1, 8-dihydroxynaphthalene sulfonic acid present as impurity is practically nil, which fact clearly demonstrates the value of the ammonia pressure used in our fusion method. The presence of ammonia prevents the splitting off of the amino-group in the 1-naphthylamine sulfonic acids, thereby causing higher yields and a distinctly improved quality of the finished product to be obtained.

We are aware that numerous details of the process may be varied through a wide range without departing from the spirit of this invention, and we do not desire limiting the patent granted other than as necessitated by the prior art.

We claim as our invention:—

1. The method of preparing 1, 8-aminonaphthol-3, 6-disulfonic acid, which includes the fusion with caustic alkalies of 1-naphthylamine-3, 6, 8-trisulfonic acid in the presence of added ammonia.

2. The method of preparing 1, 8-aminonaphthol-3, 6-disulphonic acid, which consists in fusing 1-naphthylamine-3, 6, 8-trisulfonic acid with caustic alkalies under ammonia pressure the ammonia being introduced prior to the fusion step.

In testimony whereof we have hereunto subscribed our names.

IVAN GUBELMANN.
JOHN M. TINKER.